June 11, 1968     C. W. KELSEY     3,387,801
VERTICAL TAKEOFF AIRCRAFT
Filed March 8, 1966     2 Sheets-Sheet 1
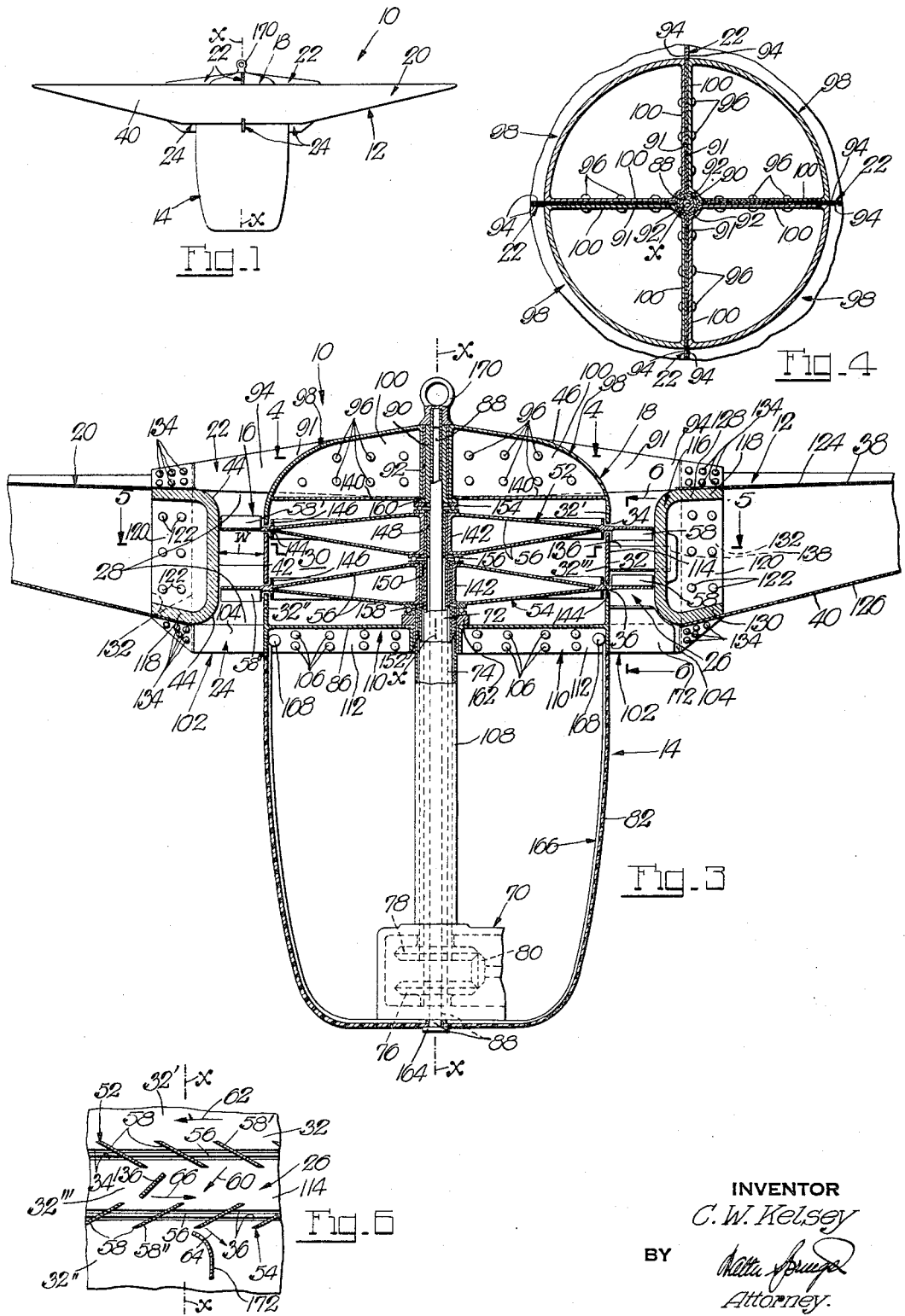
INVENTOR
C. W. Kelsey
BY
Attorney.

June 11, 1968        C. W. KELSEY        3,387,801
VERTICAL TAKEOFF AIRCRAFT
Filed March 8, 1966        2 Sheets-Sheet 2
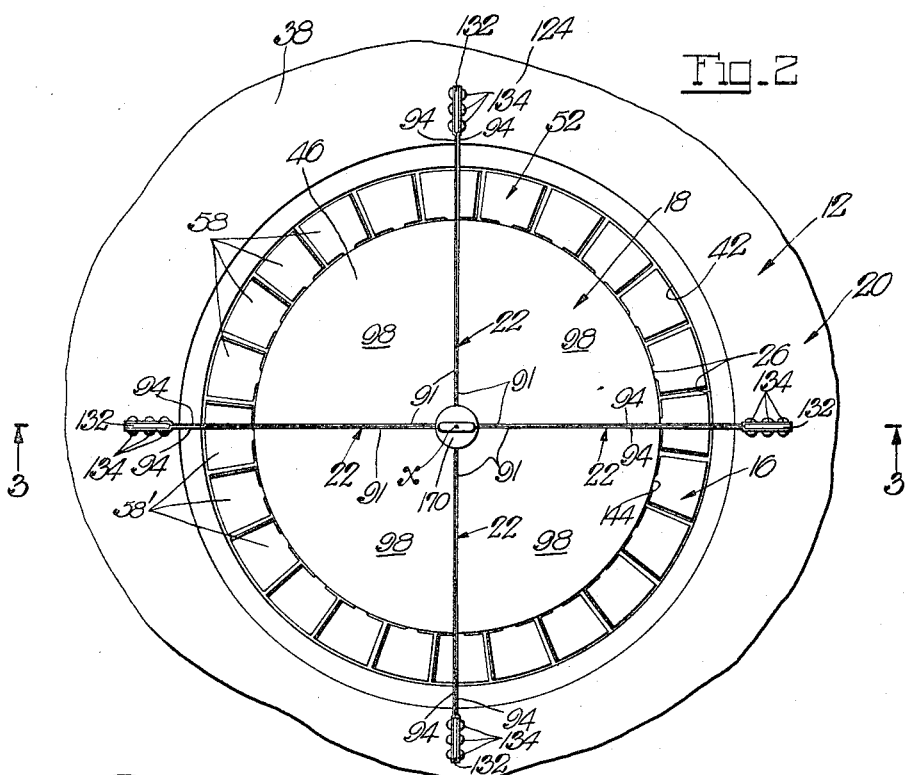
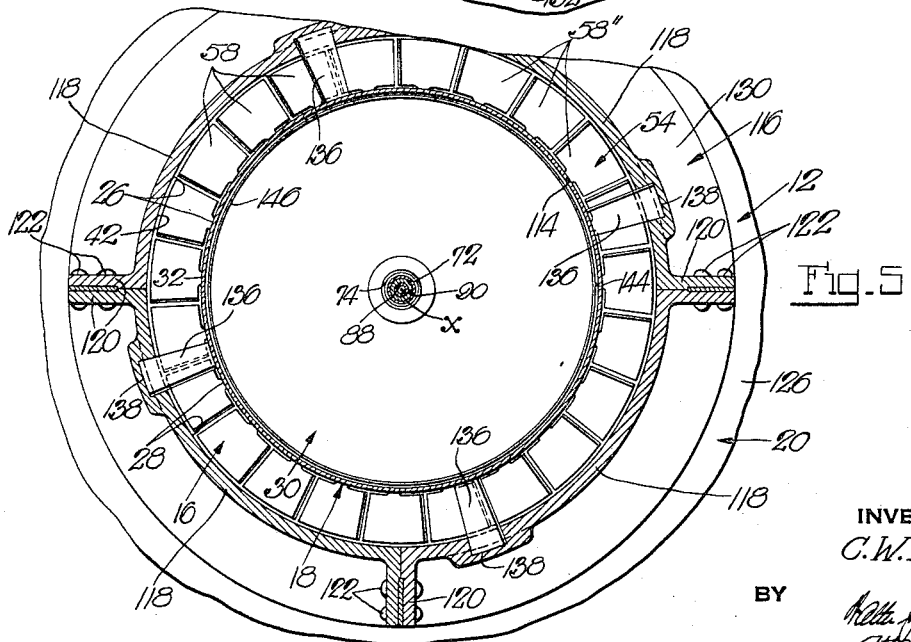
INVENTOR
C. W. Kelsey
BY
Attorney.

United States Patent Office 3,387,801
Patented June 11, 1968

3,387,801
VERTICAL TAKEOFF AIRCRAFT
Cadwallader W. Kelsey, Guilford, Conn., assignor to Skycar, Inc., New Haven, Conn., a corporation of Connecticut
Filed Mar. 8, 1966, Ser. No. 532,681
8 Claims. (Cl. 244—23)

ABSTRACT OF THE DISCLOSURE

A vertical takeoff aircraft provides a wing structure with a vertical axis having inner and outer sections of which the inner section has spaced outwardly extending braces on which the outer section is mounted so as to form between the sections a through-duct about the axis. Spinner members in a chamber in the inner wing section are power-driven about the axis and have outer air impeller blades projecting into the through-duct, and a fuselage is suspended from the inner wing section.

This invention relates to aircraft of propeller-powered vertical takeoff type in general, and to lift-producing structure of this type of aircraft in particular.

The type of aircraft with which the present invention is concerned has a fixed wing structure in contrast to the movable wing structure of a helicopter, and a high-speed impeller to displace air for its dynamic lift reaction with the wing structure. Aircraft of this type are known and have been introduced more frequently in recent years, but none of them is or has been used to any notable extent undoubtedly because of their more or less inferior and even risky lift performance and/or complicated and expensive construction or excessive size and bulk for a given load.

It is a primary object of the present invention to provide an aircraft of this type which in its lift performance is quite superior to and more reliable than that of prior aircraft of this type, yet is of exceedingly simple inexpensive and condensed construction for a given load, so much so that the aircraft becomes costwise competitive with, and to many more attractive in performance and safety than, private automobiles, for example.

It is another object of the present invention to provide an aircraft of this type of which the power impeller and wing system produces a particularly high lift component of the sum total of both, vacuum and air pressure. This is achieved by arranging the wing structure disc-like and of good aerodynamic section throughout, and providing in the otherwise uninterrupted disc expanse of the wing structure a substantially concentric ring-like through-duct of rather extensive diametral expanse so as to be well spaced from both, the center and outer periphery of the wing structure, and of a width sufficiently smaller in comparison to its diametral expanse to produce by high-speed counter-driven impeller blades therein at reasonably moderate power application to the latter downward displacement of air in very large volume and at a high rate per time unit, which makes not only for quite forceful and rather even vacuum lift effect on the upper wing surface throughout its extensive area but also for particularly forceful up-thrust reaction of the air on the spinning impeller blades, whereby the lift component on the impeller and wing system becomes quite high.

It is a further object of the present invention to provide an aircraft of this type in which the fuselage carries the impeller power drive besides the passenger load, and is arranged below and substantially centrally of the wing structure, and the aforementioned through-duct in the wing structure is of a diametral expanse to encompass the fuselage. With this arrangement, the aircraft has a particularly low center of gravity for stable and substantially sway-free flight in all directions, including safe descent by the parachute effect of the wing structure on a power stall or shutoff, and the impelled air will on the impeller and wing system have up-thrust and vacuum lift reaction which is at a maximum and not in any way impeded by the fuselage.

Another object of the present invention is to provide an aircraft of this type in which the wing structure is a self-contained unit assembled on a center post from which the fuselage is also suspended, with the aforementioned counter-driven impeller blades in the wing duct being provided on the periphery of spinner discs which in the interior of the wing structure are journalled on the center post through intermediation of telescoped hollow drive shafts for the respective discs that extend into the fuselage to the power drive unit, and the spinner discs exerting their operative thrust through antifriction bearings, directly to the center post. With this arrangement, the parts or sections of the impeller and wing system and the fuselage advantageously have in the center post a common mount and reference location which makes for simple and low-cost as well as accurate mass production of the aircraft, and operational up-thrust of the impeller is transmitted to the rest of the craft advantageously centrally thereof and well above its center of gravity for the ultimate in stable power flight and ease of steering the craft.

A further object of the present invention is to provide an aircraft of this type in which the aforementioned spinner discs of the impeller blades and their journal bearings are provided in a partitioned internal chamber in the wing structure which is sealed off except for an-anular passages to the wing duct through which extend with minimum clearance the blade-carrying spinner disc peripheries and which are preferably formed quite tortuous to impede air flow between the wing duct and chamber. With this arrangement, the air pressure in the chamber will at all times be the same as that in the wing duct, but air turbulence in the chamber is virtually non-existent, whereby the wing duct is to all practical intents and purposes closed except at its inlet and outlet ends for optimum efficiency.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of an aircraft embodying the present invention;

FIG. 2 is an enlarged fragmentary top view of the aircraft;

FIG. 3 is a fragmentary vertical section through the aircraft taken substantially on the line 3—3 of FIG. 2;

FIGS. 4 and 5 are fragmentary horizontal sections through the aircraft taken substantially on the lines 4—4 and 5—5, respectively, of FIG. 3; and FIG. 6 is a fragmentary section through the aircraft taken substantially on the line 6—6 of FIG. 3.

Referring to the drawings, the reference numeral 10 designates an aircraft of vertical takeoff type, having a wing system 12, a fuselage 14 and power flight means 16. The wing system 12 is formed, in this instance, by a center unit 18 with a vertical axis $x$, and a surrounding ring-like wing structure 20 which by angularly-spaced braces, in this instance braces 22 and 24 of upper and lower sets (FIG. 3), is mounted on the center unit 18 in equally spaced relation therewith to form therebetween an axial through-duct 26 concentric with the axis $x$ of which the duct part 28 between the upper and lower braces 22 and 24 is annularly uninterrupted. The center unit 18 provides an annular chamber 30 concentric with the axis $x$, and has in its outer peripheral wall 32 axially-spaced annular passages 34 and 36 from the chamber 30 to the duct part 28, with the chamber 30 being sealed from the outside except at the passages 34 and 36. The ring-like wing structure 20 has upper and lower surfaces 38 and 40 and an inner peripheral, and preferably cylindrical, surface 42 which joins the upper and lower wing surfaces 38 and 40 in the preferred smooth curvature fashion indicated at 44 (FIG. 3). The upper surface 46 of the center unit 18 forms a central wing surface complemental with the upper surface 38 of the surrounding wing structure 20, with this central wing surface 46 and the ring-like wing structure 20 together forming the wing system 12.

Suspended from the center unit 18 in a manner described hereinafter is the fuselage 14 as shown more or less diagrammatically in FIGS. 1 and 3. Included in the power flight means 16 are air impellers 52 and 54, each having a spinner member or disc 56 and air impeller blades 58 on its outer periphery. The spinner members 56 are in the chamber 30 journalled for rotation about the axis $x$ and extend peripherally with clearance through the annular passages 34 and 36 for the projection of their air impeller blades 58 into the duct part 28 (FIG. 3). The air impellers 52 and 54 are in operation driven in opposite directions, with the blades 58' of the upper impeller 52 being inclined to the axis $x$ in the exemplary fashion shown in FIG. 6 so as to thrust air downwardly in the general direction of arrow 60 in the power drive of impeller 52 in the exemplary direction of arrow 62, and the blades 58" of the lower impeller 54 being oppositely inclined to the axis $x$ (FIG. 6) so as to continue the downward thrust of the air from the upper impeller 52 in the general direction of the arrow 64 on the power drive of impeller 54 in the direction of the arrow 66, i.e., opposite to the exemplary drive direction of the upper impeller 52. Operational upward thrust of the power-driven impellers 52 and 54 is transmitted to the center unit 18 in a manner described hereinafter. The power flight means also include an aircraft engine (not shown) and a transmission 70 which in this instance is mounted in the fuselage 14 at the bottom thereof, and hollow drive shafts 72 and 74 which carry at their lower ends bevel gears 76 and 78 of the transmission 70 and extend upwardly in the fuselage 14 and into the chamber 30 in the center unit 18 wherein they carry the impellers 52 and 54, respectively, with the bevel gears 76 and 78 in the transmission 70 being driven by a common bevel pinion 80 for the power drive of the air impellers 52 and 54 in opposite directions as specified. Suitable landing gear, steer provisions, as well as numerous details of the fuselage and interior thereof, have been omitted since they do not form part of the present invention, the fuselage 14 being in this instance confined in a normally closed, but accessible, casing 82 of any suitable tough and preferably transparent plastic. Further, the fuselage 14 is arranged so as to be preferably substantially within the peripheral confines of the center unit 18 thereabove so as not to interfere with the free downward exhaust of the air forced through the duct 26 in the wing system 12 by the power-driven impellers 52 and 54.

The present aircraft is highly efficient in its operation and reliable in its performance. Thus, with the ring-like wing structure 20 being of good aerodynamic section throughout and even augmented in its lift capacity in power flight by the upper wing surface 46 of the center unit 18, the wing system 12 affords optimum lift capacity for its size. Further, with the axial through-duct 26 in the wing system 12 being well spaced from the center as well as the outer periphery of the latter, the therein operating air impellers draw air fairly evenly over the entire upper surface of the wing system with ensuing equally even vacuum lift effect of the air on this entire upper wing surface. Further, with the through-duct 26 in the wing system 12 being of limited width $w$ (FIG. 3) and the air impellers 52 and 54 being counterdriven at fairly high speeds, the downward displacement of air through the duct 26 occurs in very large volume and at a high rate per time unit, which makes not only for quite forceful and even air lift effect on the entire upper surface of the wing system and also air up-thrust against the lower surface of the wing system, but also for particularly forceful up-thrust reaction of the air on the spinning impeller blades, whereby the lift component on the impeller and wing system becomes quite high. Also, with the fuselage, which carries the impeller power drive and also the passenger load, being arranged below and substantially centrally of the wing system, the aircraft has a particularly low center of gravity for stable and substantially sway-free flight in all directions, including the safe descent by the parachute effect of the wing system on a power stall or shutoff.

The present aircraft is also of exceedingly simple and low-cost construction and readily lends itself to efficient mass production. Thus, the center unit 18 and fuselage 14 may be constructed in any articulated fashion in the form of a single body with a transverse partition 86 to divide the body into the chamber 30 and the fuselage 14 therebeneath, with the body having the axially-spaced outward braces 22 and 24 for mounting the ring-like wing structure 20. In its preferred form, however, the center unit 18 is formed in several separate sections which are directly or indirectly mounted on and located from a center post 88 coaxial with the axis $x$. Thus, the upper end of the center post 88, which is preferably a light-weight but strong tube, has fast thereon a mounting sleeve 90 to which are secured the upper braces 22. These upper braces 22 are formed from initially flat metal sheets or sections 91 of which each is bent to form a hub-like part 92 and therefrom radiating arm parts 94 which in this instance are spaced 90° apart (FIG. 4). These bent sections 91 are assembled with each other on the mounting sleeve 90 in the fashion shown in FIG. 4, i.e., their hub-like parts 92 are placed against the mounting sleeve 90 in surrounding fashion and their arm parts 94 are placed against each other to form four separate and equi-angularly spaced braces 22, with the engaging arm parts 94 being at 96 riveted to each other for securement of the individual sections 91 to each other and their firm clamp-on on the mounting sleeve 90. The upper surface 46 and a continuing part 32' of the peripheral wall 32 of the center unit 18 is formed by complemental quarter sections 98 having end flanges 100 which bear against the upper braces 22 and are riveted thereto at 96 (FIGS. 3 and 4). The lower braces 24 are in this instance formed, similarly as the upper braces 22, from bent sheet metal sections 102, with the radiating arms 104 of adjacent sections being placed against each other and riveted together at 106 (FIG. 3) for their assembly into four equi-angularly spaced lower braces 24 and their firm attachment by clamping to a tubular column 108. A lower part 32" of the peripheral wall 32 of the center unit 18 and in this instance also the partition 86 are formed by complemental quarter sections 110 having end flanges 112 which bear against the lower braces 24 and are riveted thereto at 106. The remaining part 32'" of the peripheral wall 32 of the center unit 18 is formed by a cylindrical ring 114 which is supported from the surrounding wing structure 20 in a manner described hereinafter, and which is interposed between and axially spaced from the wall parts 32' and 32" to provide the annular passages 34 and 36 thereat.

The ring-like wing structure 20 has a center ring 116 which is formed of a plurality, in this instance four, preferably molded complemental parts 118 (FIG. 5) of the preferred section shown in FIG. 3, with each part having end flanges 120 placed against each other and riveted together at 122 (FIG. 5), with the upper and lower surfaces 38 and 40 of the wing structure 20 being formed in this instance by suitably reenforced sheet metal parts 124 and 126 that are suitably joined at their outer peripheries and suitably secured, as by welding or riveting, to the top and bottom flanges 128 and 130 of the center ring 116. The ring-like wing structure 20 may in all or most respects be like the wing structure disclosed in my copending application Ser. No. 516,604, filed Dec. 27, 1965.

For the attachment of the ring-like wing structure 20 to the upper and lower braces 22 and 24, there are riveted at 122 to the complemental central ring parts 118 between their adjoining end flanges 120 axial mounting plates 132 which extend with their ends beyond the center ring 116 and there are riveted at 134 to the upper and lower braces 22 and 24 between their arm parts 94 and 104 (FIGS. 2 and 3).

The cylindrical ring 114 of the center unit 18 is supported from the ring-like wing structure 20 by a plurality of vanes 136, in this instance four, which extend outwardly from the ring 114 through the duct part 28 in the wing system 12 and are anchored at 138 in the center ring 116 of the wing structure 20 (FIGS. 3 and 5). The vanes 136 are preferably inclined to the axis $x$ so as to extend planewise in the general flow direction (arrow 60 in FIG. 6) of the forced air from the upper impeller blades 58' for least impediment of this air.

As already mentioned, the chamber 30 in the center unit 18 is sealed from the outside except at the annular passages 34 and 36 to the duct part 28. This chamber 30 is preferably kept annularly uninterrupted throughout, and to this end the chamber is terminated at the top by complemental partitions 140 in the quarter sections 98 of the center unit 18 below their end flanges 100 (FIG. 3). Each of the spinner members 56 of the air impellers 52 and 54 has in this instance opposite disc-like webs that extend from a hub 142 and join at a common outer peripheral margin 144 from which the impeller blades project outwardly. The spinner members 56 extend with their outer peripheral margins 144 through the annular passages 34 and 36 preferably with minimum clearance to impede as much as possible air flow from the duct part 28 into the chamber 30. In order to impede such air flow even further, the spinner members 56 are at their peripheral margins 144 provided with annular skirts 146 which extend into close proximity to and overlap the respective annular passages 34 and 36 (FIG. 3), thereby forming quite tortuous flow paths for air through these passages 34 and 36 into the chamber 30. Of course, while these tortuous flow paths permit sufficient air passage into the chamber 30 to establish the same air pressure therein as prevails at any time in the duct part 28, these tortuous flow paths and the non-interrupted condition of the chamber 30 annularly throughout combine to prevent the rise of any disturbing air turbulence in this chamber, as will be readily understood.

The hollow drive shaft 72, which carries the air impeller 52 in the chamber 30, is journalled directly on the center post 88, preferably through intermediation of a bearing sleeve or lining 148 on the latter (FIG. 3). The other hollow drive shaft 74, which carries the other air impeller 54, is journalled, internally on an outer bearing sleeve or lining 150 on the drive shaft 72, and externally in a bearing sleeve or lining 152 in the tubular column 108 (FIG. 3), whereby the tubular column 108 is also centered with respect to the center post 88 and its axis $x$.

For transmitting axial thrust of the air impellers 52 and 54 to the center unit 18, and advantageously to the center post 88, there are provided anti-friction thrust bearings 154, 156 and 158 (FIG. 3), of which bearing 154 is interposed between the upper air impeller 52 and a bottom flange 160 on the mounting sleeve 90 on the center post, bearing 156 is interposed between the air impellers 52 and 54, and bearing 158 is interposed between the lower air impeller 54 and a spacer ring 162 on the partition 86. The tubular column 108 extends with its upper end into the thrust bearing 158 to center the same, and rests with its lower end on top of the transmission 70. Of course, the primary function of the tubular column 108 is to support the assembly of the lower braces 24 and quarter sections 110 therebetween from the fuselage 14, and more particularly from the transmission 70 therein, and centered with respect to the center post 88 and its axis $x$.

The center post 88 extends in this instance downwardly through the fuselage 14 and also through the transmission 70 therein, and has in this instance a collar 164 at its lower end on which the fuselage is supported. The fuselage 14 may also have a framework 166 suitably suspended at 168 from the center unit 18, with this suspended framework affording additional support for the fuselage or providing the sole support for the latter in lieu of the center post 88, whichever is desired. Also, the center post 88 is at its top end preferably provided with an eye 170 with which to lift the aircraft when needed. The center unit 18 is preferably also provided with a plurality, for example four, equi-angularly spaced vanes 172 which project outwardly from the lower peripheral wall part 32'' of the center unit 18 into the wing duct 26 and are shaped as shown in FIG. 6 to direct the forced air from the lower air impeller 54 axially downwardly.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a vertical takeoff aircraft, the combination of a circular wing structure having a central axis and complemental inner and outer wing sections of which the outer section has an annular aperture about said axis and the inner section is substantially cylindrical about said axis and of smaller diameter than said aperture and provides a chamber, and angularly-spaced braces between said sections for mounting the outer section on the inner section with the latter located in said aperture to define therein a ring-shaped through-duct about said axis and having inlet and outlet ends, with said through-duct extending parallel to said axis from its inlet end to its outlet end and having a part axially spaced from said braces and annularly uninterrupted, said inner section having axially-spaced annular passages from said chamber to said duct part and said chamber being sealed from the outside except at said passages; a fuselage suspended from said inner section and being in axial projection within the peripheral confines of said inner section; spinner members with air impeller blades on their outer peripheries of which the members are in said chamber journalled for rotation about said axis and extend peripherally with clearance through said passages, respectively, for projection of their impeller blades into said duct part; means imparting axial thrust of said members to said inner wing section; and power means for driving said members.

2. In a vertical takeoff aircraft, the combination of a hollow body with a vertical axis having a transverse partition dividing said body into upper and lower sections, of which said lower section is in the form of a fuselage, and said upper section provides a chamber and has a top surface and a substantially cylindrical periphery about said axis and spaced outwardly extending braces on said periphery; a ring-like wing structure having upper and lower surfaces and an inner peripheral surface defining an annular aperture about said axis, said wing structure being carried by said braces with its peripheral surface in equally spaced and surrounding relation with said periphery of said upper section to define therebetween a through-duct with inlet and outlet ends, with said through-duct extending parallel to said axis from its inlet end to its outlet end and having a part axially spaced from said braces and annularly uninterrupted, with said top surface of said upper section being formed as a wing surface complemental with the upper surface of said wing structure, said upper section having in its periphery axially-spaced annular passages from said chamber to said duct part and said chamber being sealed from the outside except at said passages; spinner members with air impeller blades at their outer peripheries of which the members are in said chamber journalled for rotation about said axis and extend peripherally with clearance through said passages, respectively, for projection of their impeller blades into said duct part; means imparting axial thrust of said members to said body; and power means for driving said members.

3. The combination in a vertical takeoff aircraft as in claim 2, in which said fuselage section has a bottom and said power means include a power transmission in, and mounted on the bottom, of said fuselage section, and inner and outer hollow drive shafts coaxial with said axis and extending from said transmission through said fuselage section into said chamber and carrying said members, respectively.

4. The combination in a vertical takeoff aircraft as in claim 2, in which said spinner members are provided with an annular peripheral skirt in close proximity to and overlapping relation with said passages to provide a tortuous air path through the latter into said chamber.

5. The combination in a vertical takeoff aircraft as in claim 2, in which said lower body section is substantially within the peripheral confines of said upper body section and has a substantially cylindrical periphery about said axis and continuous with said cylindrical periphery of said upper section, and said top surface of said upper section is generally convex in cross-section and merges substantially tangentially into said cylindrical periphery of said upper section.

6. In a vertical takeoff aircraft, the combination of a center unit having a center post with a vertical axis, axially-spaced upper and lower sets of angularly-spaced radial braces fast on said post, a wall structure of inverted cup-shape with a top and a first annular rim concentric with said axis, with said structure being formed of complemental sections between and secured to the braces of the upper set, and another cup-shaped wall structure with a bottom and a second annular rim concentric with and of the same diameter as said first annular rim and axially spaced from the latter, with said other wall structure being formed by complemental sections between and secured to the braces of the lower set; a ring-like wing structure with upper and lower surfaces and an inner peripheral surface joining said upper and lower surfaces, with said wing structure being mounted on said brace sets with its inner peripheral surface in equally-spaced and surrounding relation with said rims to form therebetween an axial through-duct of which the part between said brace sets is annularly uninterrupted; an annular wall of the same diameter as said annular rims, angularly spaced arms extending in said duct part from said wing structure to said annular wall for supporting the latter from the former, with said wall being concentric with and extending between and in axially spaced relation with said rims, said wall structures and annular wall defining a chamber sealed from the outside except at annular passages to said duct part formed between said spaced rims and annular wall; upper and lower spinner members with air impeller blades on their outer peripheries of which the members are in said chamber journalled for rotation about said axis and extend peripherally with clearance through said passages, respectively, for projection of their impeller blades into said duct part above and below said arms; a fuselage beneath said other wall structure and mounted on said center post; means imparting axial thrust of said members to said center post; and power means for driving said members.

7. The combination in a vertical takeoff aircraft as in claim 6, in which said arms are vanes extending in the general flow direction of air impelled by the blades of the upper member when power-driven.

8. The combination in a vertical takeoff aircraft as in claim 6, in which said power means include a transmission in said fuselage having a housing and two bevel gears, and inner and outer hollow drive shafts coaxial with said axis and surrounding said center post, said drive shafts carrying said bevel gears, respectively, and projecting into said chamber to therein carry said members, respectively, and said center post extending through said housing.

References Cited

UNITED STATES PATENTS

| | | | |
|---|---|---|---|
| 3,170,285 | 2/1965 | Ferri | 244—23 X |
| 3,182,929 | 5/1965 | Lemberger | 244—23 X |

FOREIGN PATENTS

| | | |
|---|---|---|
| 828,090 | 2/1960 | Great Britain. |

FERGUS S. MIDDLETON, *Primary Examiner.*

B. BELKIN, *Assistant Examiner.*